Patented Jan. 10, 1939

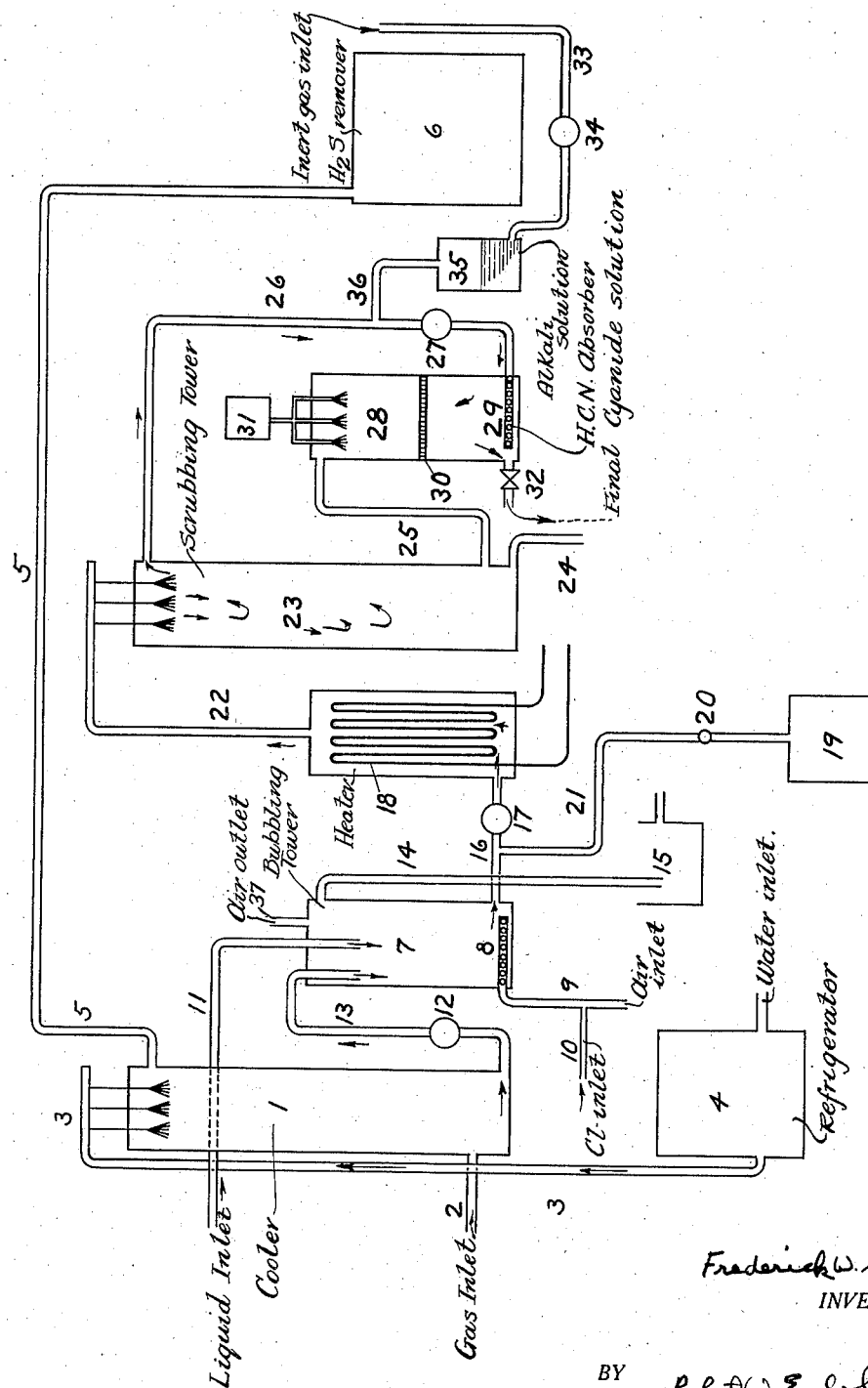

2,143,821

UNITED STATES PATENT OFFICE 2,143,821

RECOVERY OF HYDROCYANIC ACID

Frederick W. Sperr, Jr., Vineland, N. J., assignor to Röhm & Haas Company, Philadelphia, Pa.

Application July 9, 1934, Serial No. 734,420

13 Claims. (Cl. 23—151)

This invention relates to a process for the removal and recovery of hydrocyanic acid from coke oven gases. It relates particularly to a process for separating the hydrocyanic acid from gases which also contain hydrogen sulfide.

Most by-product coke plants use the so-called direct process of ammonium sulphate manufacture, in which the gas, after removal of tar, is passed through sulphuric acid. This acid combines with the ammonia in the gas to form ammonium sulphate, which crystallizes out of the acid liquor and is recovered by centrifuging. The gas which usually leaves the sulphuric acid at a temperature of 50 to 60° C., requires cooling and this is generally accomplished by direct scrubbing with water.

In the direct process substantially all of the hydrocyanic acid produced in the coking process eventually passes unchanged through the sulphuric acid. If sufficient cooling water at a sufficiently low temperature is employed in apparatus of adequate capacity, substantially all of the hydrocyanic acid in the gas is washed out, forming a dilute solution which has hitherto been allowed to go entirely to waste. My invention consists in a process for ensuring high efficiency in the removal of hydrocyanic acid from coke oven gas, and other gases, and for separating said acid from various impurities in the resulting dilute solution and recovering it in the form of sodium cyanide or other cyanogen compounds.

With cooling water at about 10° C., most of the hydrocyanic acid is washed out of the gas with a circulation of 80 to 100 gallons of water per thousand cubic feet of gas. With cooling water temperatures over 15° C it is desirable to employ a two-stage cooling system in which natural cooling water is employed in the first stage, while artificially refrigerated water is used to scrub the gas in the second stage, the temperature of this second-stage water being maintained below 10° C. In most localities this artificially cooled water will only be needed during the summer months, natural water being employed in both stages during the rest of the year.

The water after contact with the gas (i. e. the mixed water from a two-stage operation) contains 0.15 to 0.25 gram of hydrocyanic acid per liter. It may also contain hydrogen sulphide equivalent to from 10 to 50% of the weight of hydrocyanic acid. This is important as showing that the water washing has effected a substantial separation of these two substances because the incoming gas usually contains five to ten times as much hydrogen sulphide as hydrocyanic acid. This is due to the fact that hydrocyanic acid is miscible with water in all proportion whereas hydrogen sulphide is only sparingly soluble.

I have found it possible to effect a further substantial separation of hydrogen sulphide from hydrocyanic acid by simple aeration. Using about 500 cubic feet of air per thousand gallons of cooler water, 90% of the hydrogen sulphide may be removed with only a slight diminution of the hydrocyanic acid content. I may also separate the hydrogen sulphide by precipitation with a compound of metal which forms an insoluble sulphide. I have, for example, used copper sulphate, lead carbonate, and other compounds for this purpose. I may accomplish such precipitations in conjunction with aeration or may employ the precipitation to remove the last traces of hydrogen sulphide after aeration. I may also use certain gases such as chlorine, or sulphur dioxide which react with hydrogen sulphide and may employ such gases either separately or in combination with aeration. I have used other reacting substances such as bromine, chloride of lime, potassium permanganate and other oxidizing substances, but in most of such cases it is important to use only a very slight excess of the reacting substances over the chemical equivalent of the hydrogen sulphide, as any excess tends to react with the hydrocyanic acid. After numerous experiments I have found it to be a general rule that substances reacting with both hydrogen sulphide and hydrocyanic acid will preferentially react with the former before affecting the latter.

An apparatus for carrying out my invention is shown in the accompanying drawing in which: 1 is a direct contact gas cooler into which the gas enters through pipe 2 after having passed through the usual "final cooler." Cold water from pipe 3 preferably at a temperature not over 15° C is sprayed into the top of this second cooler. During the summer months refrigeration apparatus indicated by 4 may be employed to cool this water. The gas emerging from cooler 1 through pipe 5 goes to the usual apparatus for hydrogen sulphide removal which is indicated by 6.

7 represents apparatus in which the dilute solution of hydrocyanic acid is aerated and/or treated with chemicals for the separation of hydrogen sulphide. Most of the naphthalene washed out of the gas by the water is also separated in this apparatus.

The apparatus 7 may consist of a steel tank having one or more perforated steel pipes 8 or other means of air distribution into which air is blown through pipe 9. Chlorine or other reacting gas may be admitted through pipe 10. The air entering through pipe 9 escapes through the vent 37. The chlorine added reacts with any hydrogen sulphide present according to the reaction $Cl_2+H_2S=2HCl+S$. The sulphur as a fine suspension remains in the solution and is withdrawn through pipe 24. On account of its ready solubility and low partial pressure practically none of the hydrogen chloride is removed from the solution in the scrubbing tower 23 but all of it remains in the solution and is also drawn out at pipe 24. Water from the regular final cooler is admitted to the top of tank 7 through pipe 11, while water from cooler 1 is pumped by pump 12 through pipe 13 also into the top of this tank. Most of the naphthalene in the water rises to the top of the tank in the form of a scum or foam and runs out through pipe 14 which also serves as an overflow outlet for excess water. The naphthalene accumulates in sump 15 from which it may be periodically removed. The water from which most of the hydrogen sulphide has been removed passes out of the bottom of the tank through pipe 16 and is pumped by pump 17 through the heater 18. This may be a tank provided with steel coils or flues through which steam, waste gases or other heating media are passed in order to bring the water to a temperature of 55° to 70° C., which has been found satisfactory in regular operation. In case it is desired to remove or destroy the last traces of hydrogen sulphide by chemical treatment, solutions or suspensions of reacting compounds such as copper sulphate or lead carbonate are pumped from tank 19 through feed pump 20 and pipe 21 into the inlet of pump 17 where they are thoroughly mixed with water. Alternatively chlorine may be admitted through pipe 21 and if the amount of hydrogen sulphide is low, aeration in tank 7 may be largely dispensed with and the hydrogen sulphide removal accomplished entirely by chemical treatment.

The warm solution of hydrocyanic acid passes from heater 18 through pipe 22 and is sprayeed over hurdles or other contact material in the scrubbing tower 23 in which the hydrocyanic acid is removed by a current of inert gas. The water substantially free from hydrocyanic acid emerges through pipe 24 and may be allowed to run to waste or cooled by aeration and used for gas scrubbing.

In the removal of the hydrocyanic acid from the water, advantage is taken of the increase in its partial pressure when the solution is heated, the vapor or gas being swept out by a current of recirculated gas. Air cannot be used because of its oxidizing or polymerizing effect. The gas must be free of substances which react with sodium hydroxide or other compound used to absorb the hydrocyanic acid. The most convenient inert gas is the coal gas obtained from the plant itself and treated for removal of hydrogen sulphide and carbon dioxide.

The inert gas passes from pipe 25 into the scrubber 23 in which it abstracts most of the hydrocyanic acid contained in the water. The gas carrying the hydrocyanic acid passes out through pipe 26 and through blower 27 which maintains the recirculation. From this blower the gas passes into the absorber 28 through distributors 29.

The arrows shown in the drawing indicate the direction of flow of the hydrogen cyanide throughout the entire apparatus.

In the making of sodium cyanide, absorber 28 is partly filled with nonreacting packing (coke, tile, etc.) supported by grids 30. A concentrated solution of sodium hydroxide from feed tank 31 is intermittently sprayed over this packing, the excess draining into the lower part of the absorber which is used as a storage space. The distributor 29 may be located in the bottom of this space so as to cause the gas to bubble through the solution. The accumulated solution of sodium cyanide is drawn off from time to time through pipe 32. This material may be sold directly or evaporated to produce solid sodium cyanide.

Obviously, other cyanide compounds may be obtained by treating the gas passing through absorber 28 with the appropriate chemical solution. There is particular advantage in using a zincate solution as described in my United States Patent 1,213,429. When this is done the preliminary separation of hydrogen sulphide may be omitted, because insoluble zinc sulphide will be formed in the absorber and this can readily be separated from the solution of sodium zinc cyanide.

In the operation of this system small quantities of the circulating gas will be lost through leakage and other causes and must be replaced. This is preferably accomplished by taking purified gas from the regular plant purification system through pipe 33 and compressor 34 and conducting this gas through a small scrubber 35 containing a solution of sodium hydroxide or a suspension of milk of lime or some other material capable of removing carbon dioxide. Compressor 34 is arranged to operate automatically to pump sufficient gas through scrubber 35 and pipe 36 so as to maintain constant pressure in pipe 26. This pressure is usually approximately atmospheric, but other pressures may be used.

Most plants have compression apparatus for the purified gas and in such cases the compressor 34 may be replaced by any suitable governor arranged so as to automatically maintain constant pressure in pipe 26.

Obviously, the rate at which gas must be circulated to remove hydrocyanic acid from water at a given rate depends upon the temperature of the water entering the tower 23. The higher the temperature the smaller the gas rate required and vice versa. A suitable gas rate appears to be 8 to 10 cubic feet per gallon of water and at this rate satisfactory results have been obtained with a water temperature of 55 to 70° C.

As the heating of the water is the largest item of expense in the process, the heating and recirculation apparatus should be well insulated and waste steam or other source of waste heat used as much as possible. I have found a very suitable source of waste heat in the indirect type of primary coolers which is employed on many coke and gas plants. In such coolers the gas is caused to pass around tubes through which cold water is circulated and it is easy and economical to substitute the water from the final coolers. By this means such water with its hydrocyanic acid content may be warmed to a temperature corresponding with the practical requirements of the process herein described.

Although the process has been described for the recovery of hydrocyanic acid from coke oven gases, it is also applicable to other gases such as may be obtained by acidifying the cyanide solutions from metallurgical and electroplating operations.

I claim:

1. The process of recovering hydrocyanic acid from gases that also contain hydrogen sulphide, comprising scrubbing the gas with from about 80 to about 100 gallons of water per 1000 cubic feet of gas at temperatures not exceeding about 15° C., aerating the solution thus formed with about 0.5 cubic feet of air per gallon of solution, heating said solution to 55 to 70° C., passing from about 8 to about 10 cubic feet of inert gas per gallon through the heated solution, and circulating the resulting gas mixture over an absorbent for hydrocyanic acid.

2. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of hydrocyanic acid, removing substantially all the hydrocyanic acid from said solution by blowing with a larger volume of an inert gas per unit volume of solution which is a substantial multiple of the volume ratio of said air to solution and circulating the resulting gas mixture over an absorbent for the hydrocyanic acid.

3. The process of recovering hydrocyanic acid from gases that also contain hydrogen sulphide which comprises scrubbing the gas with sufficient water, the temperature of which is not over 15° C. to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of the hydrocyanic acid, heating said solution to from 55–70° C., removing substantially all the hydrocyanic acid from said solution by blowing with a substantially larger volume of an inert gas per unit volume of solution and circulating the resulting gas mixture over an absorbent for the hydrocyanic acid.

4. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of the hydrocyanic acid, heating said solution, removing substantially all the hydrocyanic acid from said solution by blowing with a larger volume of an inert gas per unit volume of solution which is a substantial multiple of the volume ratio of said air to solution, said inert gas being free of acidic constituents, and circulating the resulting gas mixture over an alkaline absorbent for the hydrocyanic acid.

5. The process of recovering hydrocyanic acid from gases that also contain hydrogen sulphide which comprises scrubbing the gas with sufficient water, the temperature of which is not over 15° C. to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of the hydrocyanic acid, heating said solution to from 55–70° C., removing substantially all the hydrocyanic acid from said solution by blowing with a substantially larger volume of an inert gas per unit volume of solution, said inert gas being free of acidic constituents, and circulating the resulting gas mixture over an alkaline absorbent for the hydrocyanic acid.

6. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of hydrocyanic acid, heating the solution, removing substantially all the hydrocyanic acid from said solution by blowing with a larger volume of an inert gas per unit volume of solution which is a substantial multiple of the volume ratio of said air to solution and circulating the resulting gas mixture over an absorbent for the hydrocyanic acid, the last two steps being carried out in a closed circuit in which the inert gas is continuously circulated.

7. The process of recovering hydrocyanic acid from gases that also contain hydrogen sulphide which comprises scrubbing the gas with sufficient water, the temperature of which is not over 15° C. to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of the hydrocyanic acid, heating said solution to form 55–70° C., removing substantially all the hydrocyanic acid from said solution by blowing with a substantially larger volume of an inert gas per unit volume of solution and circulating the resulting gas mixture over an absorbent for the hydrocyanic acid, the last two steps being carried out in a closed circuit in which the inert gas is continuously circulated.

8. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of hydrocyanic acid, heating the solution, removing substantially all the hydrocyanic acid from said solution by blowing with a volume of inert gas per unit volume of solution that is at least sixteen times as great as the volume of air used, and circulating the resulting gas mixture over an absorbent for the hydrocyanic acid.

9. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of the hydrogen cyanide while simultaneously treating it with a gaseous substance which destroys any residual hydrogen sulphide, removing substantially all the hydrocyanic acid from said solution by blowing with a substantially larger volume of an inert gas per unit volume of solution and circulating the resulting gas mixture over an absorbent for the hydrocyanic acid.

10. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of hydrocyanic acid while simultaneously treating it with chlorine to destroy the residual hydrogen sulphide, removing substantially all the hydrocyanic acid from said solution by blowing with a substantially larger volume of an inert gas per unit volume of solution and circulating the resulting gas mixture over an absorbent for the hydrocyanic acid.

11. The process of recovering hydrocyanic acid from gases that also contain hydrogen sulphide which comprises scrubbing the gas with sufficient water to absorb practically all the hydrocyanic acid but only a small fraction of the hydrogen sulphide, aerating the solution thus formed with a volume of air per unit volume of solution that is sufficient to remove substantially all the hydrogen sulphide but only small amounts of the hydrocyanic acid, adding to it a substance capable of forming an insoluble sulphide to remove any residual hydrogen sulphide, heating the solution, removing substantially all the hydrocyanic acid from said solution by blowing with a larger volume of an inert gas per unit volume of solution which is a substantial multiple of the volume ratio of said air to solution and circulating the resulting gas mixture over an absorbent for the hydrocyanic acid.

12. The process of removing hydrogen sulphide from dilute solutions of hydrocyanic acid obtained by washing coke over gases with water in an amount sufficient to absorb practically all the hydrocyanic acid but only a small fraction of the hydrogen sulphide which comprises aerating said solution with a volume of air per unit volume of solution that is sufficient to remove substantially all the hydrogen sulphide but only small amounts of the hydrocyanic acid.

13. The process of removing hydrogen sulphide from dilute solutions of hydrocyanic acid obtained by washing coke oven gases with water in an amount sufficient to absorb practically all the hydrocyanic acid but only a small fraction of the hydrogen sulphide which comprises aerating said solution at approximately 15° C. with about one-half cubic foot of air per gallon of solution.

FREDERICK W. SPERR, Jr.